United States Patent
Sakamoto et al.

[11] Patent Number: 5,875,364
[45] Date of Patent: *Feb. 23, 1999

[54] FIELD FRAME CHANGEOVER MECHANISM FOR VIEWFINDER

[75] Inventors: Takamasa Sakamoto, Osaka; Akihiro Baba, Sakai, both of Japan

[73] Assignee: Minolta Co., Ltd., Osaka, Japan

[*] Notice: The term of this patent shall not extend beyond the expiration date of Pat. No. 5,506,647.

[21] Appl. No.: 918,491

[22] Filed: Aug. 26, 1997

Related U.S. Application Data

[60] Continuation of Ser. No. 541,141, Oct. 11, 1995, abandoned, which is a division of Ser. No. 296,870, Aug. 26, 1994, Pat. No. 5,506,647, which is a continuation of Ser. No. 100,934, Aug. 2, 1993, abandoned.

[30] Foreign Application Priority Data

Aug. 6, 1992 [JP] Japan ................ UM4-55343

[51] Int. Cl.$^6$ .................................................. G03B 17/02
[52] U.S. Cl. ................................ 396/378; 396/435
[58] Field of Search ......................... 396/435, 436, 396/378, 380

[56] References Cited

U.S. PATENT DOCUMENTS

| | | | |
|---|---|---|---|
| 3,490,844 | 1/1970 | Sapp, Jr. et al. | 355/40 |
| 4,678,300 | 7/1987 | Beach | 354/21 |
| 4,682,870 | 7/1987 | Atkinson | 354/275 |
| 4,716,427 | 12/1987 | Shyu | 354/159 |
| 5,066,971 | 11/1991 | Kodaira | 354/465 |
| 5,086,311 | 2/1992 | Naka et al. | 354/195.1 |
| 5,218,442 | 6/1993 | Hamada et al. | 354/478 |
| 5,255,030 | 10/1993 | Mukai et al. | 354/94 |
| 5,398,088 | 3/1995 | Yamazaki et al. | 354/106 |
| 5,506,647 | 4/1996 | Sakamoto et al. | 354/159 |

FOREIGN PATENT DOCUMENTS

| | | |
|---|---|---|
| 3-273223 | 12/1991 | Japan . |
| 4-3430 U | 1/1992 | Japan . |
| 4-113341 | 4/1992 | Japan . |
| 4-163536 | 6/1992 | Japan . |

*Primary Examiner*—Safet Metjahic
*Assistant Examiner*—Michael Dalakis
*Attorney, Agent, or Firm*—Sidley & Austin

[57] ABSTRACT

A field frame changeover mechanism suitable for a single-lens reflex camera, which allows clear confirmation of the photo range without increasing the size of the camera. The mechanism has darkening plates movable between a darkening position where the plates cover a part of the focusing screen and an open position where the focusing screen is uncovered by the plates. When the mirror which reflects the light transmitted from the photo-taking lens of the camera to the optical system of the viewfinder of the camera moves from an observation position located in the path of light transmitted through the photo-taking lens to a photo-taking position, the darkening plates retract from the locus of the mirror's movement in a correlated manner.

15 Claims, 11 Drawing Sheets

1

FIELD FRAME CHANGEOVER MECHANISM FOR VIEWFINDER

CROSS REFERENCE TO RELATED APPLICATION

This is a continuation of U.S. patent application Ser. No. 08/541,141 filed Oct. 11, 1995, now abandoned, which is a division of U.S. patent application Ser. No. 08/296,870 filed Aug. 26, 1994, now U.S. Pat. No. 5,506,647, which is a continuation of U.S. patent application Ser. No. 08/100,934 filed Aug. 2, 1993, now abandoned.

BACKGROUND OF THE INVENTION

1. Field of the Invention

This invention relates to a field frame changeover mechanism for changing a viewfinder field of a camera between two different exposure modes.

2. Description of the Prior Art

Conventionally, in addition to taking full-size photos by exposing an entire frame of film when the shutter is released, cameras which can perform panorama photo-taking by covering the top and bottom portions of a frame to a prescribed width, exposing only the horizontal rectangular strip in between, have also been provided. In these cameras, a transparent plate, such as a focusing screen, which indicates the exposure area in panorama mode with a frame is generally used; however, with this method, it is difficult to confirm the exposure area at the time of panorama phototaking, and it is also difficult to know whether the camera is in full-size or panorama photo-taking mode.

In response to this situation, a camera is provided which contains a mechanism which changes the field from that for full-size photo-taking to a horizontally longer field for panorama photo-taking by placing darkening plates in the optical path in the vicinity of the focusing screen.

In a single lens reflex camera, it is desirable to apply a field frame changeover mechanism of a type which inserts darkening plates in order to provide accurate confirmation of the exposure area. However, in a single lens reflex camera, because the mirror which directs the light transmitted through the photo-taking lens to the viewfinder during framing is moved up to the vicinity of the focusing screen during shutter release, the movement of the mirror restricts the arrangement of the changeover mechanism, which could necessitate an increase in the size of the camera.

SUMMARY OF THE INVENTION

An object of the present invention is to provide a field frame changeover mechanism, suitable for a single lens reflex camera, which solves the above problem and is capable of clearly confirming the photo range without increasing the size of the camera.

The viewfinder field frame changeover mechanism of the present invention is characterized by the fact that the first field for the full-size photo-taking and the second field having a view area different from the first field are alternated by moving darkening plates located between the focusing screen and the mirror. The darkening plates direct the light transmitted through the photo-taking lens to the viewfinder during framing, and the darkening plates retract from the locus of movement of the mirror as the mirror moves up. Because this construction prevents mechanical interference between the darkening plates and the mirror, the darkening plates do not restrict the movement of the mirror and, thus, make an increase in the camera's size unnecessary.

Further, according to the present invention, the first/second field frame changeover mechanism is situated on the side of the mirror box of a single lens reflex camera.

Moreover, according to an alternative embodiment of the invention, in a camera of the type using more than one mirror in place of a pentaprism (hereinafter called a pentamirror), the darkening plates for switching the field frame are situated inside the hollow pentamirror near the focusing screen.

BRIEF DESCRIPTION OF THE DRAWINGS

The above objects and features of the present invention are set forth with particularity in the appended claims. The present invention, both as to its organization and manner of operation, together with further objects and advantages thereof, may best be understood by reference to the following detailed description, taken in connection with the accompanying drawings.

DETAILED DESCRIPTION OF THE PREFERRED EMBODIMENTS

The camera viewfinder field frame changeover mechanism of a first embodiment of the present invention is described in detail below with reference to FIG. 1 through FIG. 9. The viewfinder field frame changeover mechanism is constructed such that it performs switching between a field for full-size photo-taking and a field for panorama photo-taking, such modes having a different aspect ratio.

Figure 1:
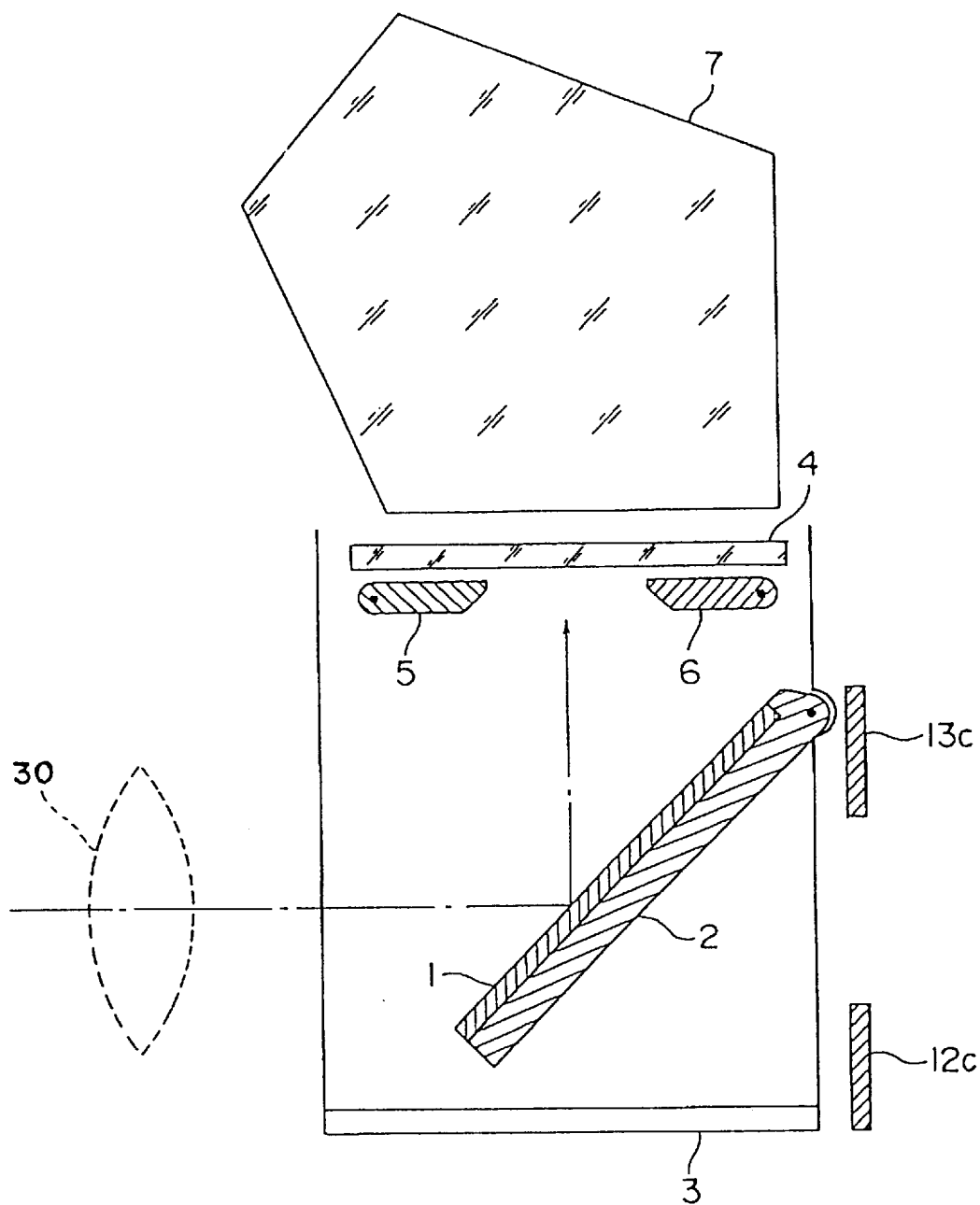
FIG. 1 is a cross-sectional view showing the important parts of the field frame changeover mechanism according to one embodiment of the present invention in panorama mode.
Figure 2:
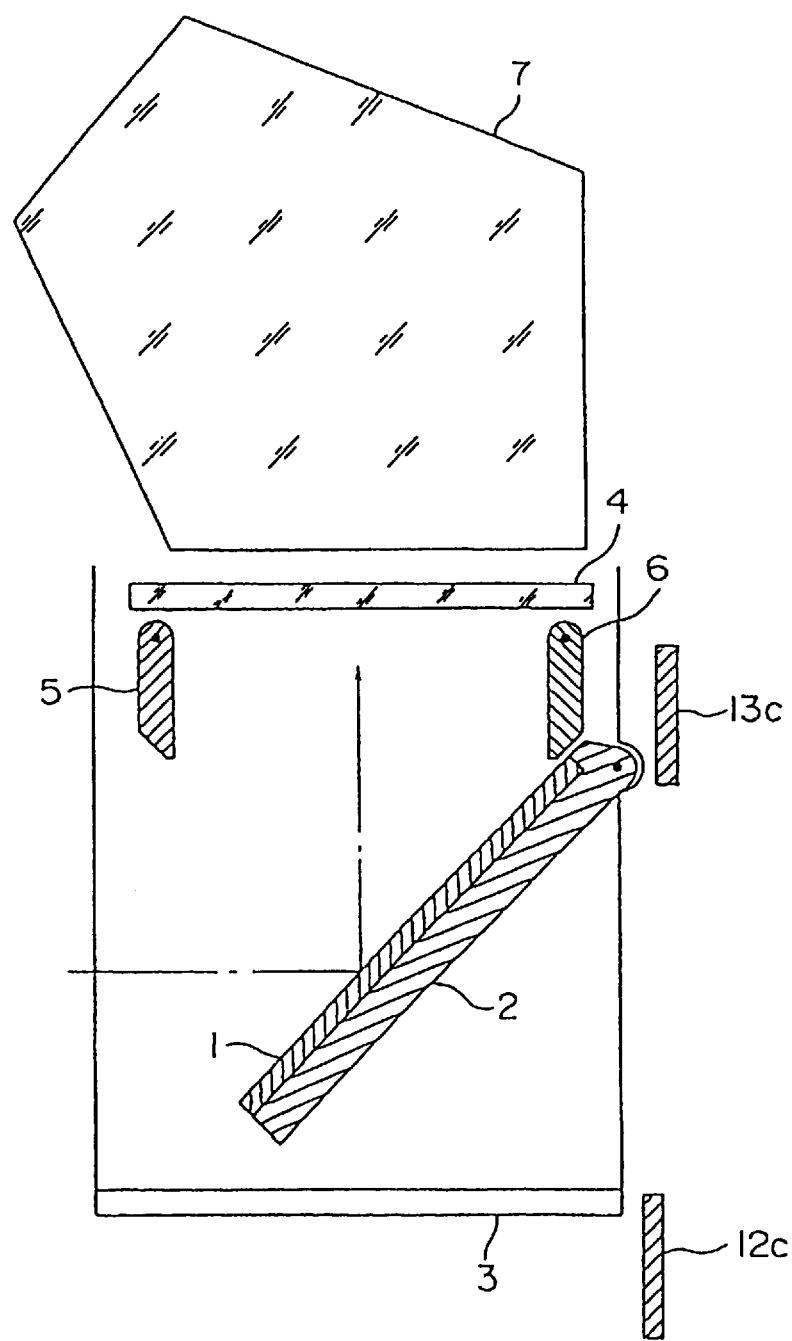
FIG. 2 is a cross-sectional view showing the important parts of the mechanism of FIG. 1 in full-size mode.
Figure 3:
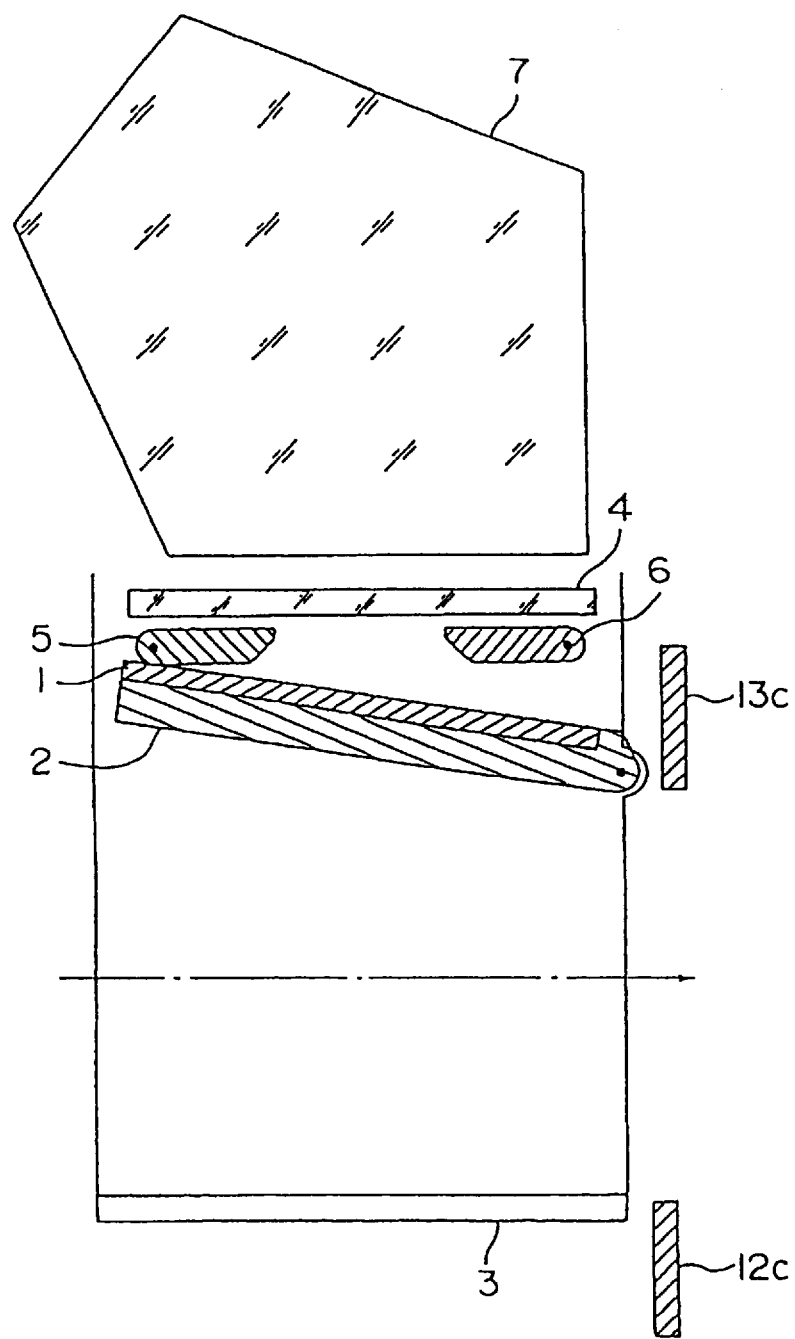
FIG. 3 is a cross-sectional view showing the important parts of the mechanism of FIG. 1 with the mirror moved up.

FIGS. 1, 2 and 3 are cross-sectional views showing the important parts of the field frame changeover mechanism. FIG. 1 illustrates the mechanism in panorama mode, FIG. 2 in full-size mode, and FIG. 3 when the mirror is moved up. In the drawings, 1 is a mirror which reflects the light transmitted through the photo-taking lens of a camera (schematically illustrated at 30 in FIG. 1) to the viewfinder optical system of the camera and 2 is a mirror support which supports mirror 1. Mirror support 2 is supported by mirror box 3. Accordingly, mirror support 2 can move between an observation position, angled 45 degrees to the path of the light passing through the photo-taking lens to the film exposure surface as shown in FIGS. 1 and 2, and a photo-taking position, retracted from the light path as shown in FIG. 3. Reference number 4 is a focusing screen located at the upper portion of mirror box 3. Under and near focusing screen 4 are located darkening plates 5 and 6 to restrict the field frame. Above focusing screen 4 pentagonal roof prism 7 is located to direct the light reflected by mirror 1 to the eyepiece of the viewfinder optical system. Darkening plates 5 and 6 are placed between focusing screen 4 and mirror 1 at the photo-taking position such that they may be set at a darkening position, as shown in FIG. 1, in which portions of focusing screen 4 are covered, or at an open position, as shown in FIG. 2, in which almost the entire area of focusing screen 4 is open.

Figure 4:
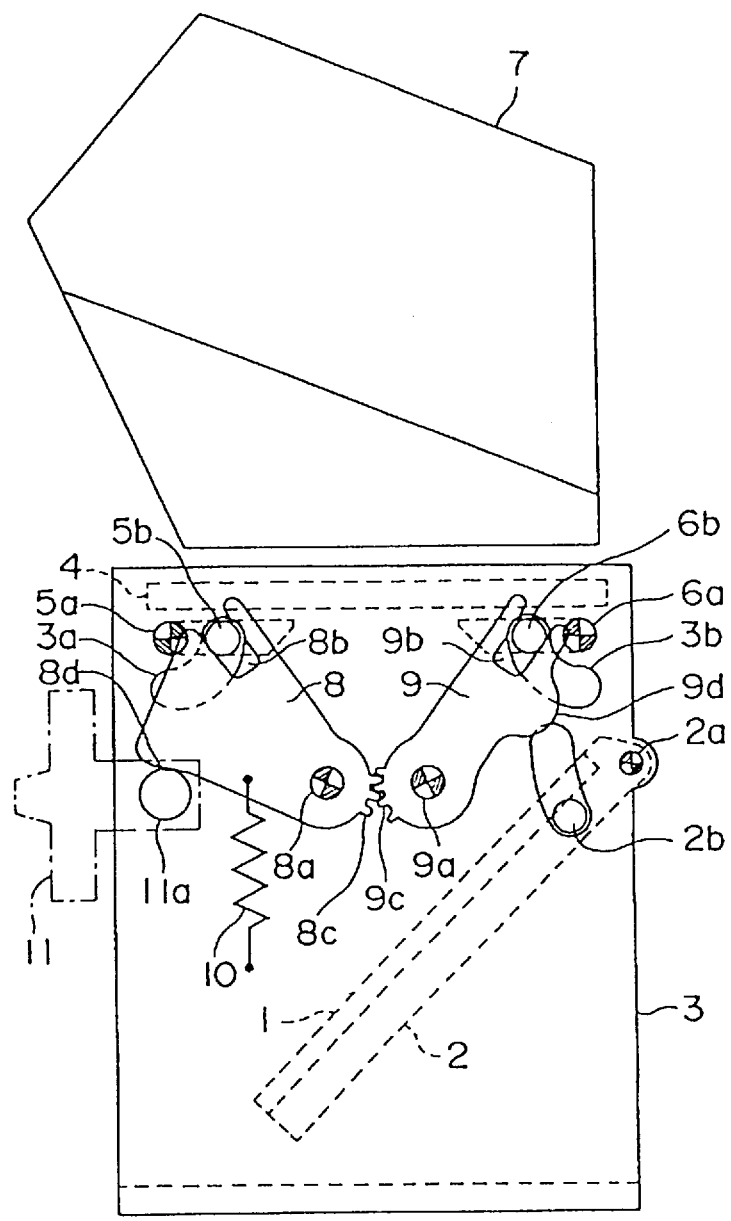
FIG. 4 is a cross-sectional view showing the drive mechanism for the darkening plates of FIG. 1 in panorama mode.
Figure 5:
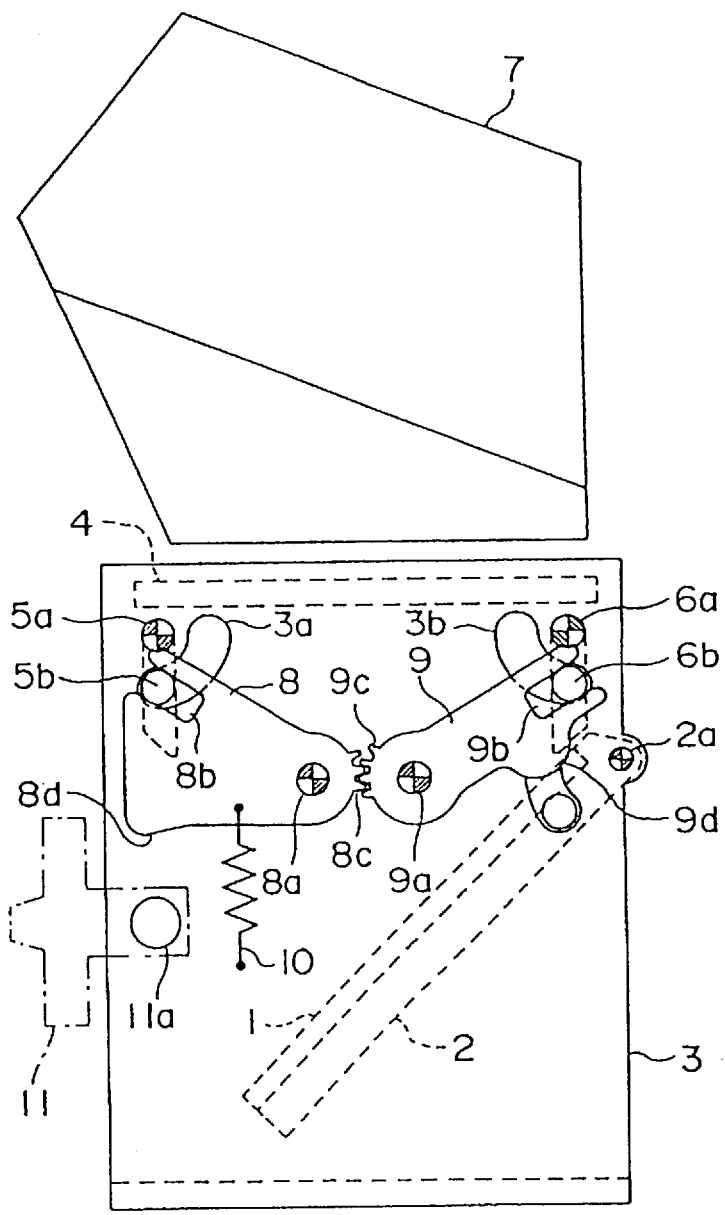
FIG. 5 is a cross-sectional view showing the drive mechanism of FIG. 4 in full-size mode.
Figure 6:
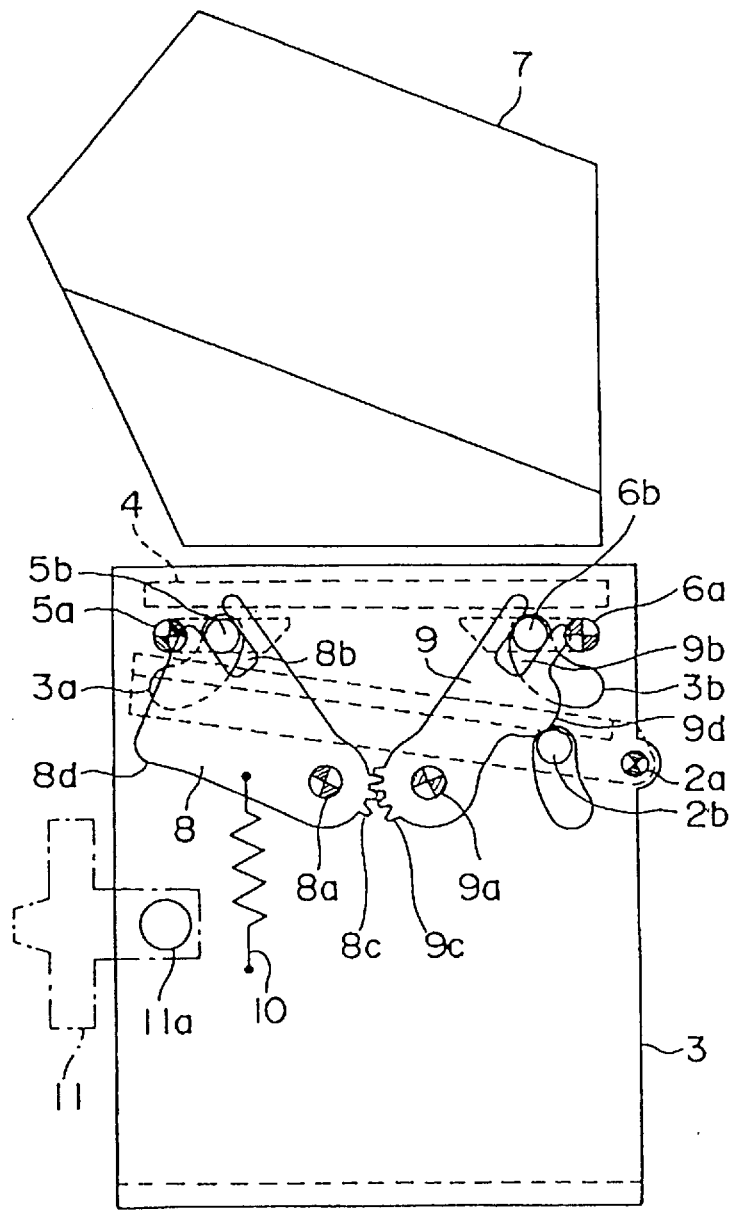
FIG. 6 is a cross-sectional view showing the drive mechanism of FIG. 4 with the mirror moved up.

FIGS. 4 through 6 show the drive mechanism for darkening plates 5 and 6. FIG. 4 illustrates the drive mechanism in panorama mode, FIG. 5 in full-size mode and FIG. 6 when mirror 1 is moved up. The drive mechanism shown in the drawings is located on the side of mirror box 3. As shown in the drawings, darkening plates 5 and 6 are rotatably mounted on mirror box 3 via support axes 5a and 6a, respectively. In addition, darkening plates 5 and 6 have pins 5b and 6b on their side ends, respectively. Mirror box 3 has guide grooves 3a and 3b, which engage guide pins 5b and 6b, such that darkening plates 5 and 6 can each rotate approximately 90 degrees.

Darkening plates 5 and 6 are driven by first and second drive levers 8 and 9. Drive levers 8 and 9 are rotatably supported by support axes 8a and 9a fixed on mirror box 3 such that they rotate in mutually opposing directions around support axes 8a and 9a via gears 8c and 9c formed to engage with each other. First drive lever 8 has a groove 8b on a line passing through the center of support axis 8a, in which pin 5b is movably inserted. Second drive lever 9 has a groove 9b on a line passing through the center of support axis 9a, in which pin 6b is movably inserted. Further, first drive lever 8 has a protrusion 8d which protrudes outward from the line connecting support axis 8a and groove 8b, and second lever 9 has a protrusion 9d which protrudes outward from the line connecting support axis 9a and groove 9b.

First drive lever 8 is given a driving force by spring 10 such that it rotates counterclockwise in the drawings around support axis 8a. Therefore, darkening plates 5 and 6 are normally kept in the retracted position shown in FIGS. 2 and 5, corresponding to the full-size mode. On the other hand, a changeover operation member 11 is located near mirror box 3 and is mounted on the camera in such a manner that it may be operated from outside the camera. When drive pin 11a on operation member 11 is moved up, first drive lever 8 rotates clockwise in the drawings around support axis 8a, and darkening plates 5 and 6 are moved to and kept in the darkening position shown in FIGS. 1 and 4 corresponding to the panorama mode. In addition, when mirror 1 is moved up to the photo-taking position in the full-size mode, second drive lever 9 rotates counterclockwise in the drawings around support axis 9a by drive pin 2b formed on mirror support 2, and darkening plates 5 and 6 rotate from the open position to the darkening position. When mirror 1 returns to the observation position, the restriction of drive levers 8 and 9 by drive pin 2b is released, whereupon darkening plates 5 and 6 return to the open position by the spring force of spring 10. In the panorama mode, because both drive levers 8 and 9 are maintained in the position shown in FIG. 4 by operation member 11, darkening plates 5 and 6 are maintained in the darkening position irrespective of the movement of mirror 1.

As described above, in the present embodiment, darkening plates 5 and 6, which are situated inside mirror box 3 so as to protrude toward mirror 1 at the time of full-size photo-taking, are constructed such that they extend along focusing screen 4 as mirror 1 is moved up at the time of shutter release. Because of this, the movement of mirror 1 is prevented from limiting the arrangement of the changeover mechanism, which makes it unnecessary to increase the size of the camera. In addition, because darkening plates 5 and 6 are located near focusing screen 4, and near an object image formation of the optical system of the viewfinder when in the darkening position, blurring of field frame 4 inside the viewfinder is prevented, and good visual confirmation of the viewfinder field can be obtained.

Figure 7:
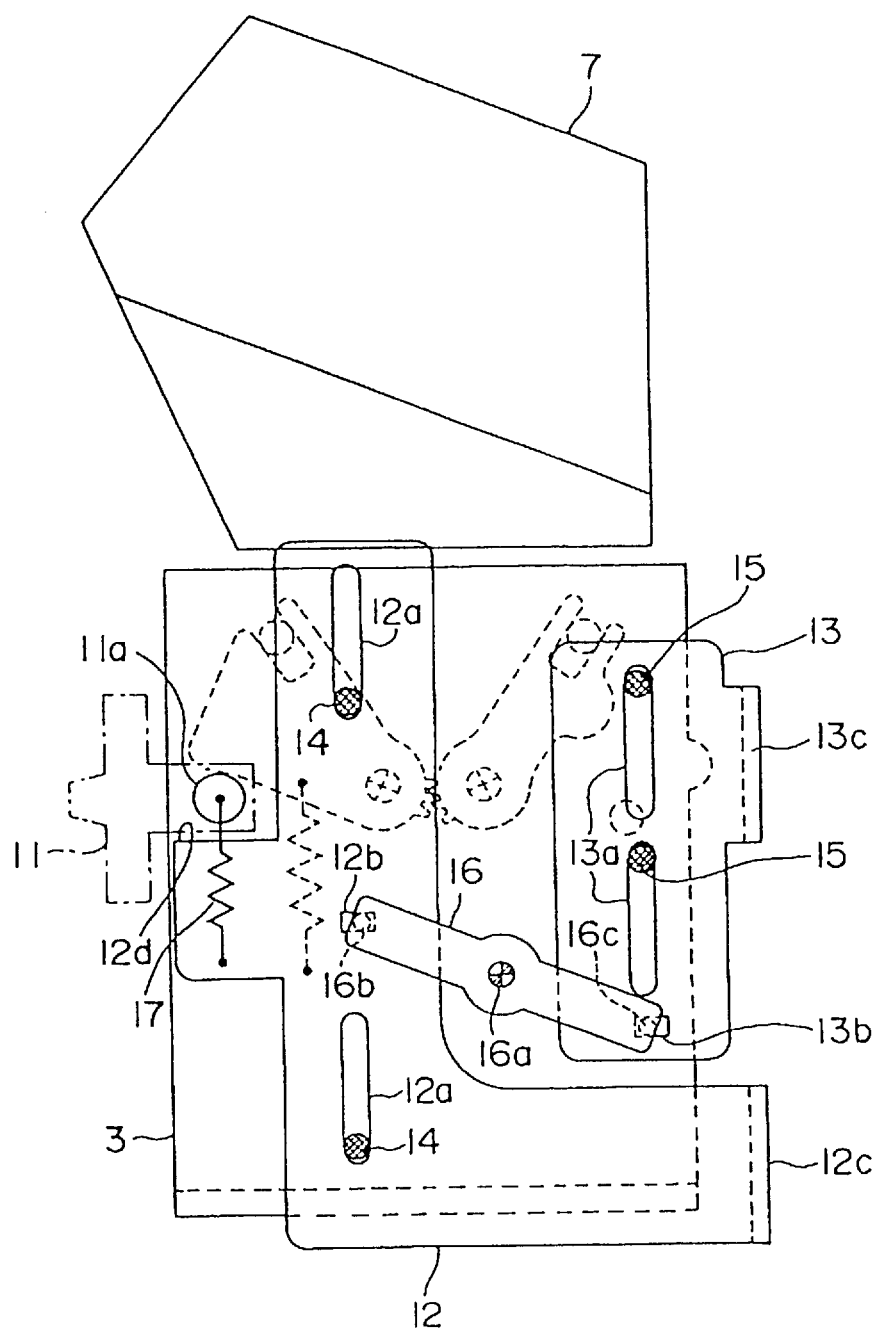
FIG. 7 is a cross-sectional view showing the exposure area changeover mechanism of the present invention in panorama mode.
Figure 8:
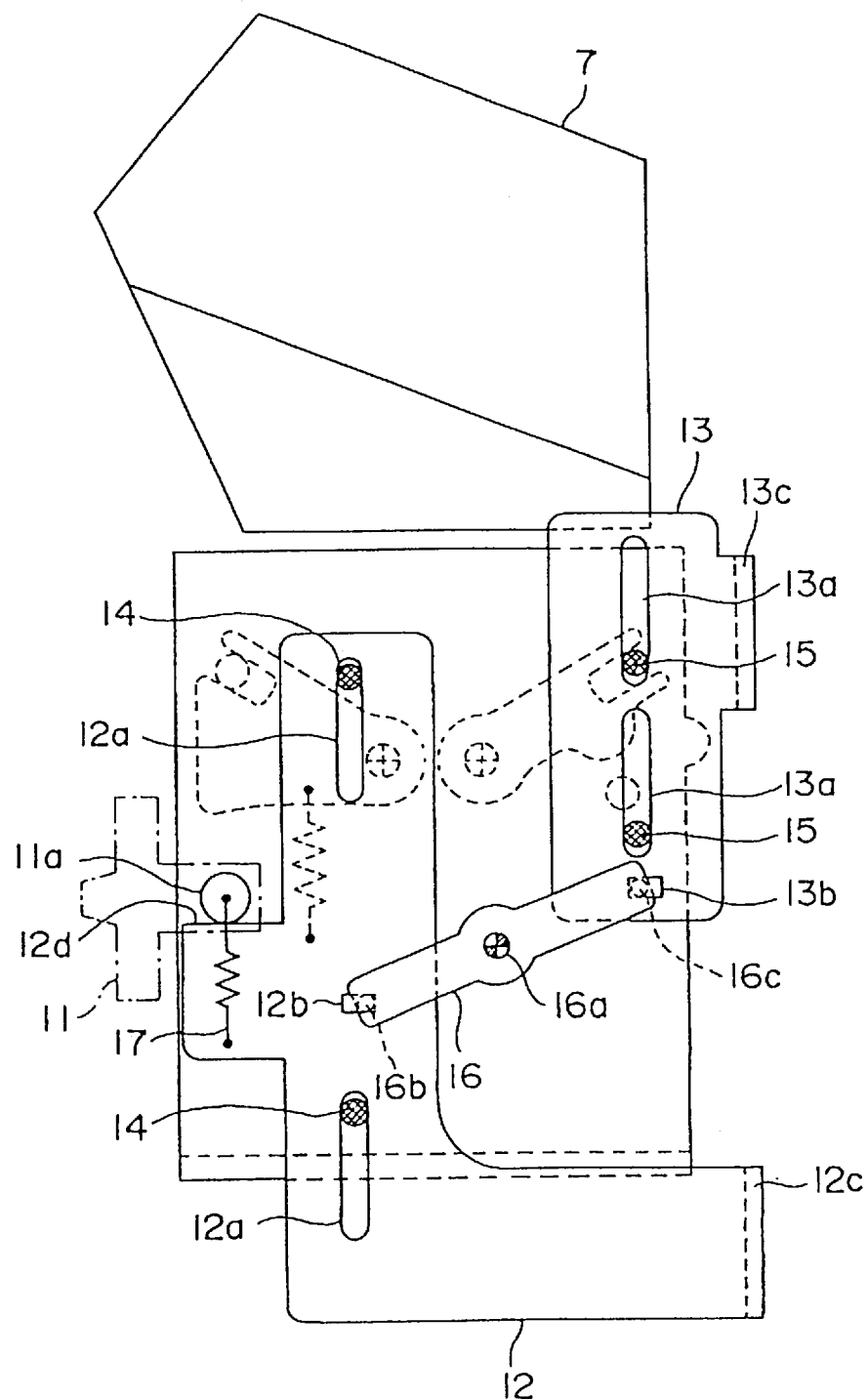
FIG. 8 is a cross-sectional view showing the exposure area changeover mechanism of FIG. 7 in full-size mode.
Figure 9:
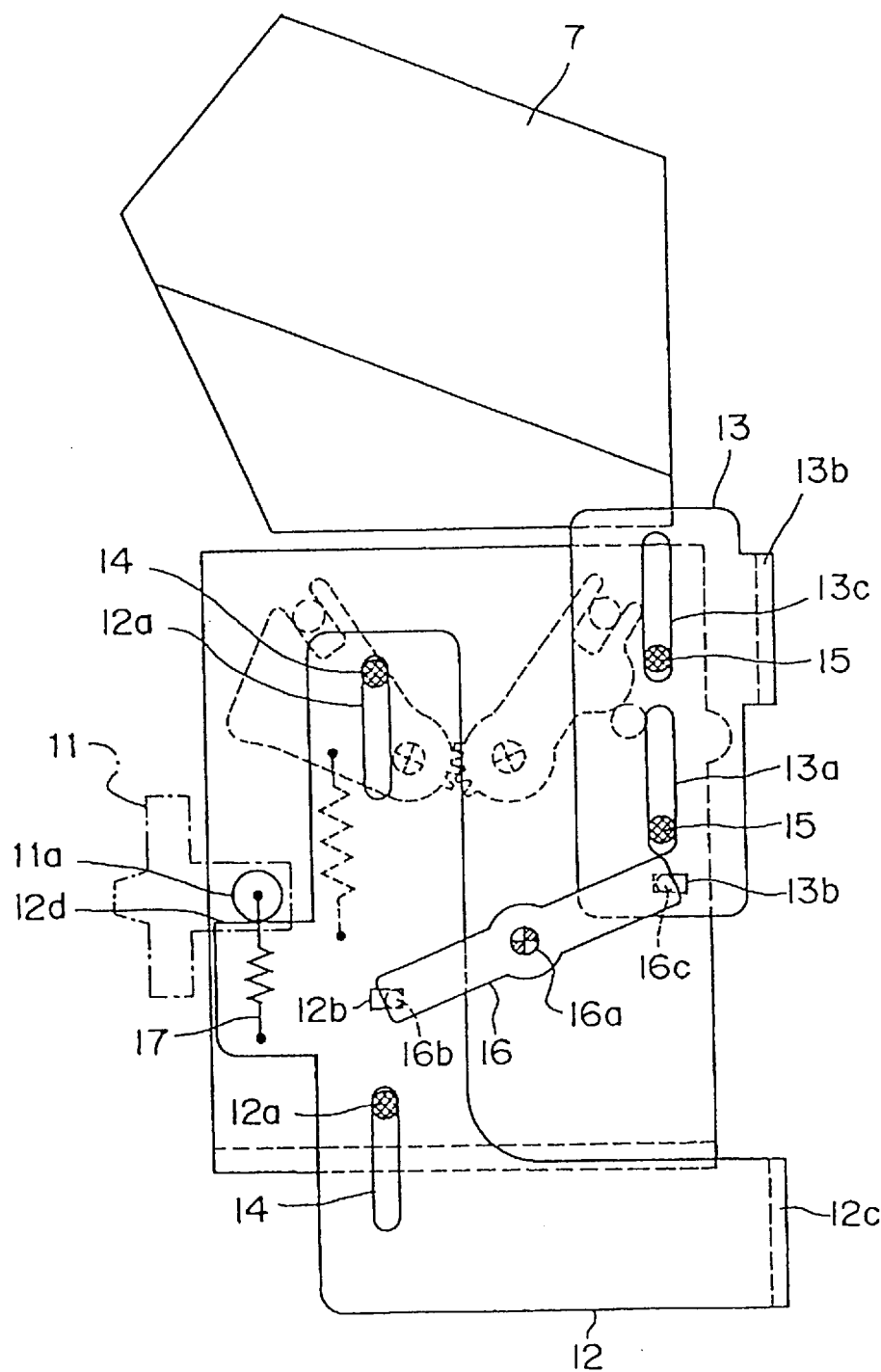
FIG. 9 is a cross-sectional view showing the exposure area changeover mechanism of FIG. 7 with the mirror moved up.

On the other hand, in the camera of the present embodiment, the changeover of the film exposure area is carried out in connection with the switching of the viewfinder field. FIGS. 7 through 9 show the exposure area changeover mechanism. FIG. 7 illustrates the mechanism in panorama mode, FIG. 8 in full-size mode and FIG. 9 when mirror 1 is moved up. The mechanism shown in FIGS. 7 through 9 is located to the side of mirror box 3 similar to the field frame changeover mechanism.

Reference numbers 12 and 13 are darkening members for the switching of the exposure area. Darkening members 12 and 13 have long holes 12a and 13a, respectively, to guide the vertical movement of the darkening members, which are mounted to guide pins 14 and 15 fixed on the side of mirror box 3. Darkening members 12 and 13 also have long holes 12b and 13b extending horizontally in the drawing, in which pins 16b and 16c formed on both ends of connecting lever 16, which rotates around axis 16a, are inserted. Therefore, when darkening member 12 slides up, darkening member 13 slides down and when darkening member 12 slides down, darkening member 13 slides up. Because of this, the exposure area is limited via darkening parts 12c and 13c of darkening members 12 and 13, which are located in front of the film.

Darkening members 12 and 13 alternate between the panorama mode shown in FIG. 7 and the full-size mode shown in FIG. 8 via the operation of changeover operation member 11 described above. When changeover operation member 11 is down, drive pin 11a presses down protrusion 12d of darkening member 12. Consequently, connecting lever 16 rotates counterclockwise around axis 16a and darkening member 13 is lifted, whereby an exposure area corresponding to full-size photo-taking is obtained. Conversely, when operation member 11 is moved up, darkening member 12 connected to drive pin 11a via spring 17 is lifted, and darkening members 12 and 13 move to the ends of their movement range dictated by long holes 12a and 13a. Spring 17 is designed such that it extends somewhat when this happens, as a result of which the upper and lower edges of the exposure area in the panorama mode are fixed at certain locations at all times. The picture frame changeover mechanism, as described above, operates simultaneously with the field frame changeover mechanism via the operation of operation member 11, while when mirror 1 is moved up in full-size mode as shown in FIG. 9, the picture frame changeover mechanism does not operate in connection with the movement of the mirror.

Figure 10:
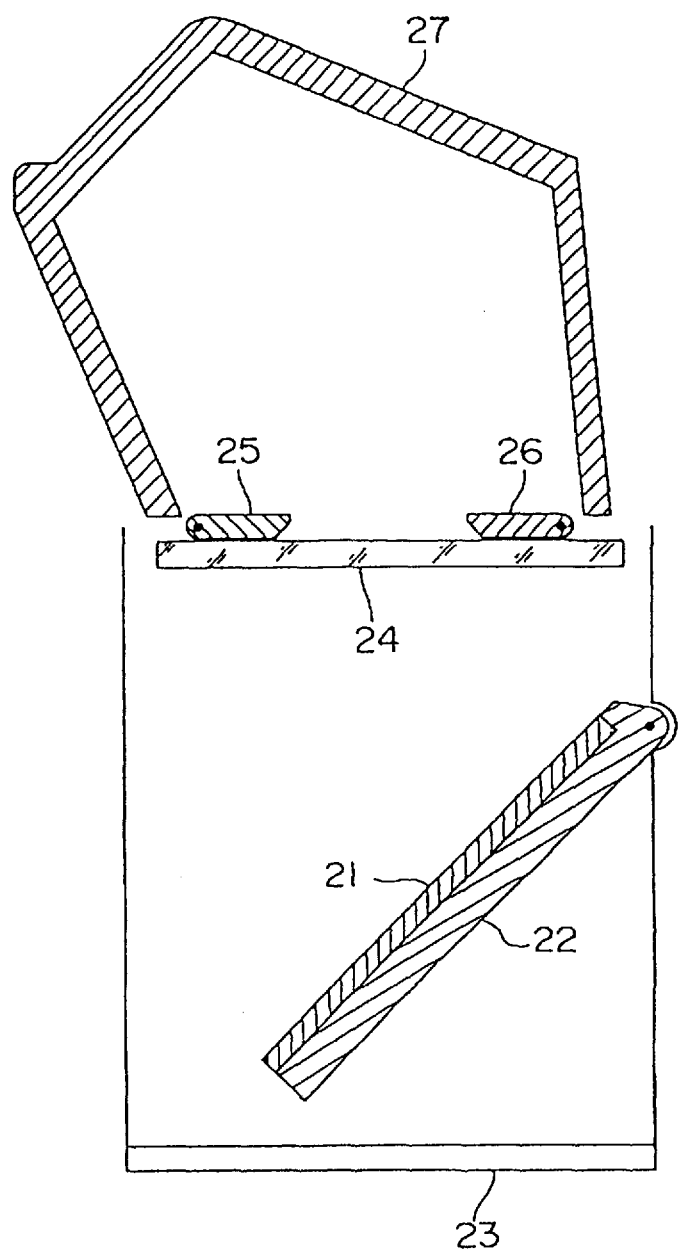
FIG. 10 is a cross-sectional view showing the important parts of a field frame changeover mechanism of a modified embodiment of the present invention in panorama mode.
Figure 11:
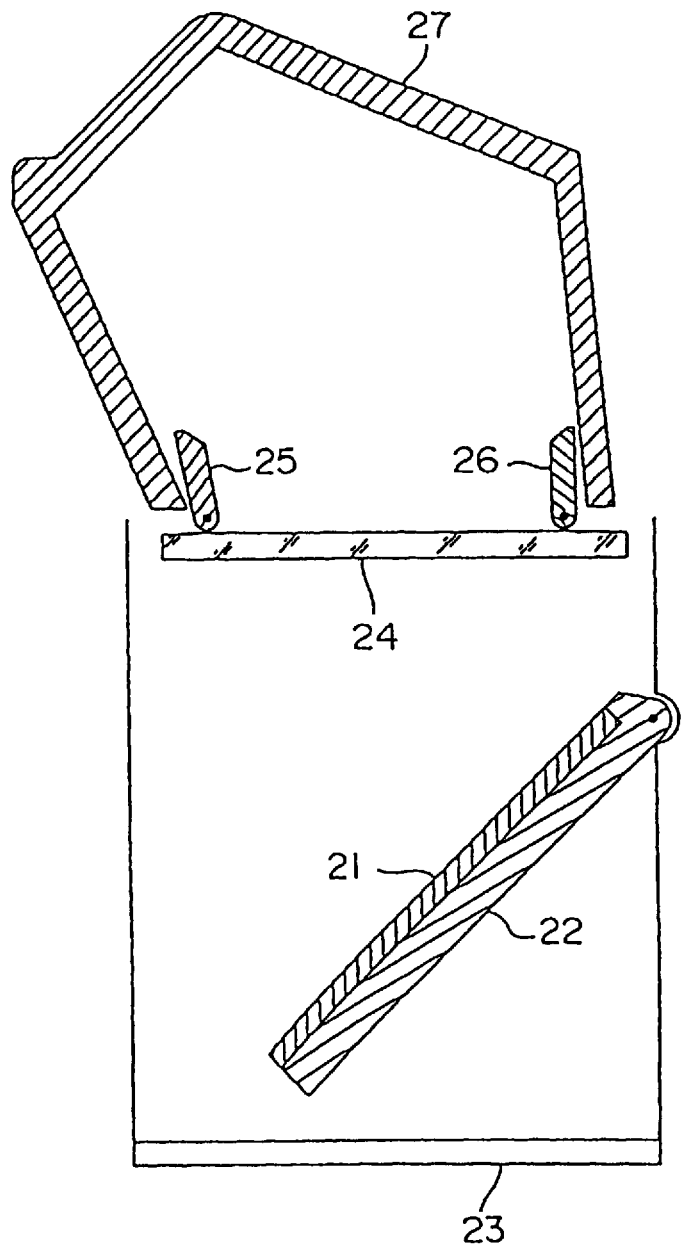
FIG. 11 is a cross-sectional view showing the important parts of the mechanism of FIG. 10 in full-size mode.

Next, the field frame changeover mechanism of a modified embodiment of the present invention shown in FIGS. 10 and 11 is described. FIGS. 10 and 11 are cross-sectional views showing the important parts of the field frame changeover mechanism according to the modified embodiment. FIG. 10 illustrates the mechanism in panorama mode and FIG. 11 in full-size mode. As shown in the drawings, this modified embodiment is different from the previous embodiment in that the camera has pentamirror 27 instead of a pentaprism, and darkening plates 25 and 26 are located on the upper side of focusing screen 24. In the drawings, 21, 22 and 23 are a mirror, a mirror support and a mirror box, respectively. In addition, similar to the previous embodiment, darkening plates 25 and 26 can perform switching between full-size mode and panorama mode using a mechanism located on the side of mirror box 23, equivalent to that shown in FIGS. 4 through 6. In this modified embodiment, however, because darkening plates 25 and 26 are not in the way of the movement of mirror 21 even in full-size mode, the mechanism to retract darkening plates 25 and 26 for the upward movement of the mirror is not provided.

Even when darkening plates 25 and 26 are constructed such that they extend along the upper surface of focusing screen 24 in panorama mode and protrude into pentamirror 27 in full-size mode, an increase in the size of the camera, as well as any restriction caused by the mirror to the arrangement of the changeover mechanism, can be prevented.

It should be understood that the present invention may be embodied in other specific forms than those described above without departing from the spirit or essential characteristics thereof. The above-described embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A viewfinder field frame changeover mechanism for a camera equipped with a viewfinder having two optical members providing a space therebetween, wherein a first optical member includes a surface for projecting an optical flux for forming a viewfinder image and a second optical member includes a surface on which said optical flux falls to form the viewfinder image, wherein a field frame for a first field of view and another field frame for a second field of view having a range different from the first field of view are interchangeable, comprising:

two darkening plates which rotate to change their postures between a first position outside an optical flux path of the viewfinder and a second position in the optical flux path of the viewfinder so as to delineate said another field frame by shielding the outside optical flux of the first field of view;

a selection mechanism which selects either the first field of view or the second field of view; and a drive mechanism which rotates said darkening plates to said first position when the first field of view is selected by said selection mechanism, and which rotates said darkening plates to said second position when the second field of view is selected by said selection mechanism, wherein at the first position said darkening plates are rotated in such a manner so that, utilizing the space between the optical members, said darkening plates are outside the optical flux path of the viewfinder and substantially parallel to an optical axis of the optical flux of the viewfinder.

2. The mechanism as recited in claim 1, wherein said first field of view corresponds to full-size photo-taking and said second field of view corresponds to panorama photo-taking.

3. The mechanism as recited in claim 2, wherein the second position of said darkening plates is near an object image formation point in an optical system of the viewfinder.

4. The mechanism as recited in claim 3, wherein said camera is a single-lens reflex camera having a focusing screen.

5. The mechanism as recited in claim 1, wherein said darkening plates shield upper and lower portions of said first field of view.

6. The mechanism as recited in claim 1, further comprising two shielding plates provided in a photographing optical flux of said camera, said shielding plates shield outside the range corresponding to said second field of view when said selection mechanism selects the second field of view.

7. A mechanism as recited in claim 1, wherein one of said optical members moves in said space.

8. A mechanism as recited in claim 1, wherein one of said optical members is utilized for changing the direction of the optical axis and the changed optical axis passes through the space.

9. A viewfinder field frame changeover mechanism for a camera equipped with a viewfinder and framing to shield an optical flux, said optical flux forming a viewfinder image, on an upper side and a lower side, wherein a first field frame for a full frame photo-taking and a second field frame for a panoramic frame photo-taking are interchangeable, comprising:

two darkening plates which rotate to change their postures between a first position outside an optical flux path of the viewfinder and a second position in the optical flux path of the viewfinder so as to delineate an upper and a lower edge of the second field frame by shielding the outside optical flux of the full frame photo-taking range;

a selector provided on an outer surface of the camera and manually operated in order to select one of the full frame photo-taking and the panoramic frame photo-taking; and a driving mechanism which is functionally connected to said selector and said darkening plates so as to rotate said darkening plates in response to the manual operation of said selector;

wherein for full frame photo-taking, said darkening plates are rotated in such a manner so that said darkening plates are outside the optical flux path of the viewfinder and substantially parallel to an optical axis of the optical flux of the viewfinder.

10. The mechanism as recited in claim 9, wherein the second position of said darkening plates is near an object image formation point in an optical system of the viewfinder.

11. The mechanism as recited in claim 10, wherein said camera is a single-lens reflex camera having a focusing screen.

12. The mechanism as recited in claim 9, further comprising two shielding plates provided in a photographing optical flux of said camera, said shielding plates shield outside the panoramic frame photo-taking range when said selector selects the panoramic photo-taking.

13. A viewfinder field frame changeover mechanism for a camera equipped with a viewfinder and framing to shield optical flux on a first frame side and an opposing frame side, said optical flux forming a viewfinder image, said camera being capable of selecting a mode between a first phototaking mode having a first photo-taking range and a second photo-taking mode having a second photo-taking range which is different from the first photo-taking range, said mechanism comprising:

two darkening plates which rotate to change their postures between a first position outside an optical flux path of the viewfinder and a second position in the optical flux path of the viewfinder so as to delineate a field frame by shielding the outside optical flux of the first photo-taking range;

a selector provided on an outer surface of the camera and manually operated in order to select one of the first and second photo-taking modes; and a driving mechanism which is functionally connected to said selector and said darkening plates so as to rotate said darkening plates in response to the manual operation of said selector, wherein for the first photo-taking mode, said darkening plates are rotated in such a manner so that said darkening plates are outside the optical flux path of the viewfinder and assume a posture substantially parallel to an optical axis of the optical flux of the viewfinder.

14. The mechanism as recited in claim 13, further comprising two shielding plates which shield outside of the second photo-taking range of a photography optical flux when said selector selects the second photo-taking mode.

15. A single-lens reflex camera including a viewfinder in which a field frame for a first field of view and another field frame for a second field of view having a range different from the first field of view are interchangeable, and a field frame changeover mechanism for changing the field frame between the field frame for the first field of view and the field frame for the second field of view; the improvement comprising wherein the field frame changeover mechanism is located on a side of a mirror box which supports a mirror which reflects light transmitted through a photo-taking lens of the camera to an optical system of the viewfinder.

* * * * *